M. T. CROSBY.
PIE PAN.
APPLICATION FILED SEPT. 8, 1915.
1,191,672.
Patented July 18, 1916.
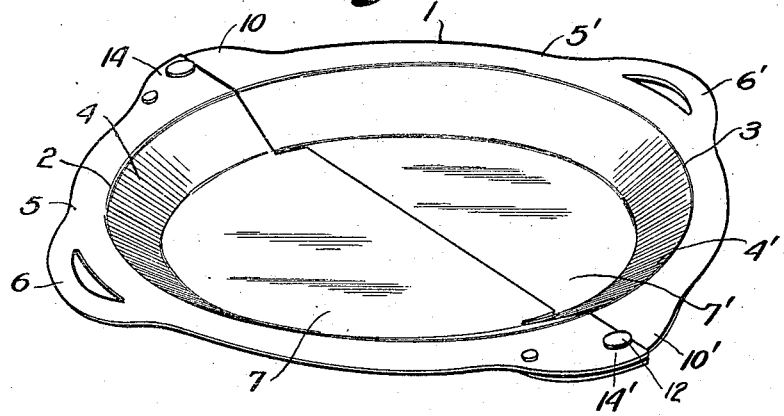
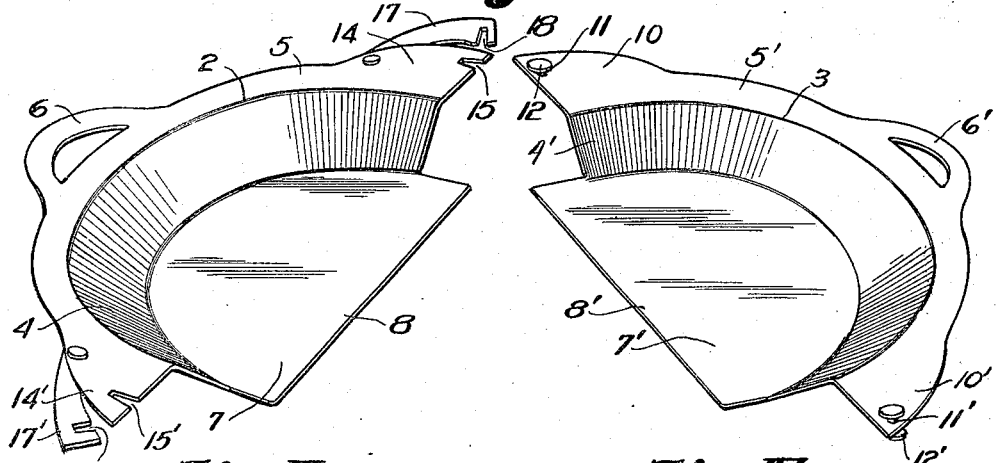
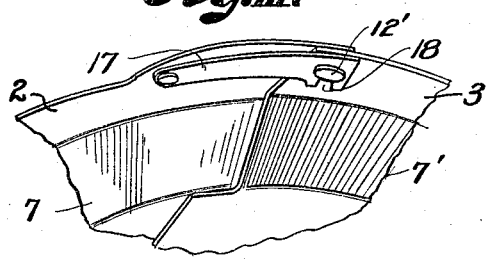
INVENTOR
May T. Crosby.
BY
Arthur C. Brown.
ATTORNEY

UNITED STATES PATENT OFFICE.

MAY T. CROSBY, OF KANSAS CITY, MISSOURI.

PIE-PAN.

1,191,672.

Specification of Letters Patent.

Patented July 18, 1916.

Application filed September 8, 1915. Serial No. 49,600.

*To all whom it may concern:*

Be it known that I, MAY T. CROSBY, a citizen of the United States, residing at Kansas City, in the county of Jackson and State of Missouri, have invented certain new and useful Improvements in Pie-Pans; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to pie pans and has for its principal object to provide a pan from which a pie or the like may be removed without breaking the crust or marring the formation of the article that has been baked therein. In accomplishing this object I have provided improved details of structure, the preferred forms of which are illustrated in the accompanying drawings, wherein:—

Figure I is a perspective view of a pan constructed according to my invention, showing the parts in closed relation. Fig. II is a similar view showing the parts spaced to indicate their separation when a pie, or the like, is to be delivered from the pan onto a plate. Fig. III is an enlarged detail perspective view of the under face of the rim showing the latch members. Fig. IV is an inverted perspective view of a part of a pan, showing the bottom latch button.

Referring more in detail to the drawings:—1 designates the pan as a whole and 2—3 the opposite separate sections into which the pan is divided, and which comprise the ordinary inclined edge walls 4—4' and rims 5—5'.

Formed integrally with and extending from the center of each of the rims 5—5' is a handle 6—6', whereby the pan sections may be conveniently handled, and extending forwardly from the edges of bottom members 7—7' are lips 8—8' which are adapted to overlap when the sections are brought together to form a closed pan; the side walls 4—4' and rims 5—5' also overlapping in order to close the joint between the pan sections.

Formed integrally with the rim of one pan section, and at the open end thereof, are extensions or flanges 10—10' and fixed to said extensions are studs 11—11', which project above and below the flanges and carry upper and lower buttons 12—12'. Formed integrally with the rim of the opposite pan (here shown as the section 2), are like flanges 14—14' similar to the flanges 10—10' of the first named section and having end slots 15—15' adapted for receiving the studs 11—11' on the opposite pan section when the parts are assembled.

Pivotally mounted on the rim 5 of section 2 are straps 17—17' which are adapted for movement beneath the flanges 14—14' and have laterally opening slots 18 which are also adapted for receiving the studs 11—11' on the rear flanges of the opposite pan section, to lock or latch the parts in assembled relation, the slots in the latch lying at right angles to the slots in the body flange when the parts are assembled to lock the slotted parts to the opposite flanges.

Assuming the parts to be constructed as described, when the pan is to be used, the parts are brought together and latched through the connection of the straps 17—17', with the studs 11—11', the bottom lips, side wall, rims and flanges of the opposite sections overlapping to completely close the pan and prevent the escape of contents through the joint of the separate sections. When the pan is used for baking a pie, or the like, the baking is performed in the usual manner and when the contents of the pan are to be removed, the pan is placed over a plate, or the like, and the sections unlatched and drawn apart to permit the pie to rest on the plate; it being apparent that as the material of which the pan is composed is relatively thin, the pie may move from the pan onto the plate without breaking or marring the crust, and that as it is unnecessary to lift the pie by the crust, there is no strain placed on the latter and the breaking or marring is reduced to a minimum.

While I have described the pan as of a specific construction, with the parts on particularly identified sections, it is apparent that such particular identification has been merely for purposes of illustration, and without the intention of limiting the scope of the invention.

Having thus described my invention, what I claim as new therein, and desire to secure by Letters-Patent, is:

1. The combination with separate pan sections, each consisting of a bottom and a side wall and a horizontal rim on the side wall, the horizontal rims having projecting flanges at their free facing edges, the flange on one rim having a stud and the flange on the other rim a slot for receiving the stud, a latch pivotally mounted in the slotted flange and having a transverse slot adapted for overlying the stud receiving slot and for also receiving said stud to lock the sections together.

2. A pan comprising separate sections, each consisting of a bottom, a side wall and a rim on the side wall, the side walls being set back from the edges of the bottom portions whereby the said bottom portions may overlap and the said rims having stud and slot members, the slotted members being provided with pivoted latches, having transverse slots for receiving the stud members on the opposite pan section whereby the sections are locked together.

In testimony whereof I affix my signature.

MAY T. CROSBY.

Copies of this patent may be obtained for five cents each, by addressing the "Commissioner of Patents, Washington, D. C."